United States Patent
Issachar

[11] Patent Number: 6,028,521
[45] Date of Patent: Feb. 22, 2000

[54] LIQUID LEVEL SENSOR

[76] Inventor: David Issachar, 14 Wilkomitch St., Rehovot 76448, Israel

[21] Appl. No.: 08/991,882

[22] Filed: Dec. 16, 1997

[51] Int. Cl.[7] .................................................. G08B 21/00
[52] U.S. Cl. .......................... 340/624; 340/623; 340/618; 73/305; 73/307
[58] Field of Search .................................. 340/623, 624, 340/618, 619, 620; 73/305, 307, 308

[56] References Cited

U.S. PATENT DOCUMENTS

| | | | |
|---|---|---|---|
| 530,592 | 12/1894 | Kleritj | 73/308 |
| 562,761 | 6/1896 | Cram | 73/307 |
| 3,696,362 | 10/1972 | Sieron | 340/244 |
| 3,702,910 | 11/1972 | Akeley | 200/84 |
| 3,823,328 | 7/1974 | Barton et al. | 307/118 |
| 3,849,771 | 11/1974 | Applin | 340/245 |
| 3,944,845 | 3/1976 | Luteran | 307/118 |
| 3,978,299 | 8/1976 | Takai | 200/84 |
| 3,997,744 | 12/1976 | Higo | 200/84 |
| 4,035,789 | 7/1977 | Akita et al. | 340/244 |
| 4,066,858 | 1/1978 | Piper et al. | 200/84 |
| 4,069,405 | 1/1978 | Fima | 340/624 |
| 4,320,626 | 3/1982 | Donnelly | 62/3 |
| 4,354,180 | 10/1982 | Harding | 340/619 |
| 4,395,605 | 7/1983 | Weston | 200/84 |
| 4,458,118 | 7/1984 | Tsubouchi | 200/84 |
| 4,459,584 | 7/1984 | Clarkson | 340/624 |
| 4,499,348 | 2/1985 | Gismervik et al. | 200/84 |
| 4,609,796 | 9/1986 | Bergsma | 200/84 |
| 4,628,162 | 12/1986 | Reinartz et al. | 200/84 C |
| 4,637,254 | 1/1987 | Dyben et al. | 340/624 |
| 4,673,925 | 6/1987 | Whiteman | 340/603 |
| 4,748,299 | 5/1988 | Custer | 200/84 |
| 4,748,300 | 5/1988 | Anderson | 200/84 |
| 4,771,272 | 9/1988 | Barnes | 340/624 |
| 4,841,849 | 6/1989 | Shimomura et al. | 99/282 |
| 5,103,673 | 4/1992 | Sawada et al. | 73/313 |
| 5,136,884 | 8/1992 | Lovett | 73/313 |
| 5,224,379 | 7/1993 | Koebernik et al. | 73/308 |
| 5,229,751 | 7/1993 | Chandler et al. | 340/618 |
| 5,299,456 | 4/1994 | George | 340/624 |
| 5,341,728 | 8/1994 | Ejiri et al. | 99/336 |
| 5,426,271 | 6/1995 | Clark et al. | 200/84 |
| 5,562,003 | 10/1996 | Lefabvre | 73/308 |
| 5,563,584 | 10/1996 | Rader et al. | 340/618 |
| 5,565,687 | 10/1996 | Berrill | 340/623 |
| 5,743,135 | 4/1998 | Sayka et al. | 340/624 |

*Primary Examiner*—Jeffery A. Hofsass
*Assistant Examiner*—Anh La
*Attorney, Agent, or Firm*—Nath & Associates; Gary M. Nath; Gregory B. Kang

[57] ABSTRACT

A liquid level sensor for reducing and monitoring liquid level in a vessel, such as a heated pot or kettle is provided. The sensor issues a signal when the liquid level drops to a level below its predetermined level. The signal may initiate an audio or visual alarm, or may stop the action causing the liquid level to drop.

35 Claims, 8 Drawing Sheets

LIQUID LEVEL SENSOR

FIELD OF THE INVENTION

The invention is generally in the field of liquid level monitoring apparatus and in particular relates to an alarmed liquid-level monitoring devices for a cooking pot.

BACKGROUND OF THE INVENTION

Many types of liquid-level sensing devices have been disclosed in the prior art. Such devices, which are usually based on magnetic, electrical-conductivity or optical parameters, enable user manipulation of the positioning of the sensing elements for either facilitating the operation of the liquid level sensor itself or the issue of a sensible output at a desired liquid level in the monitored vessel, in accordance with one or more predetermined sensing elements. Thus, for example, U.S. Pat. Nos. 3,696,362 and 3,944,845 describe a conducting liquid level control devices, which indicate when the level of a conducting liquid reaches the predetermined minimum level, while U.S. Pat. No. 4,354,180 describes an optical liquid-level sensing probe. U.S. Pat. Nos. 3,849,771 and 4,771,272 describe a portable self-contained liquid level alarm devices having a housing in which a floating magnet actuates a reed switch. U.S. Pat. No. 3,702,910 describes a level sensing control device with a reed switch which can be rotateably adjusted to any position in respect of a magnetic member connected to a float member. An additional implementations of such magnetic devices have been described inter alia in U.S. Pat. Nos. 3,702,910; 3,823,328; 3,997,744; 3,978,299; 4,035,789; 4,066,858; 4,395,605; 4,458,118; 4,459,584; 4,499,348; 4,609,796; 4,748,299; 4,748,300; 5,103,673; 5,224,379; 5,426,271 and 5,562,003.

Most of the liquid-level monitoring and alarmed systems described in the prior art, including those based on a floating magnet, are not versatile and usually have drawbacks and/or are not convenient for user manipulation. It is specially seen in cases where the monitored vessel's interior is wholly inaccessible, this may occur in the case of a sealed vessel holding hazardous material or when the content and/or prevailing conditions do not allow a simple and convenient user access and manipulation. Similar difficulties exist in the case of heated vessels, and specially in the case of cooking pot or a like.

It often occurs in everyday cooking, that a heated liquid, e.g. soup, is left simmering on a heat source without supervision. It may occur that the cooking pot is forgotten on the heat source, whereby the victuals being cooked or the cooking pot itself may be ruined and, more severely, a hazardous situation may occur. There are known devices for automatically switching-off an electrical water heater when the water level drops below the level of the heating element of the heater. Also, U.S. Pat. No. 4,673,925 describes an alarm device for removably mounting onto the upper edge of a cooking pot for providing an alarm indication when the cooking pot's liquid contents begin to boil, whilst U.S. Pat. No. 5,229,751 describes a coffee pot including an integrally provided alarm device for providing a time based alarm indication in respect of the freshness state of its liquid contents. Also, U.S. Pat. No. 5,341,728 describes an alarm device which controls cooker and indicates end-of cooking timing.

In reality, only certain household containers, for example electric kettles, are provided with liquid-level sensors and automatic alarm and/or switch-off devices, while most cooking pots and pans do not include such devices. This is primarily because the liquid-level sensors and/or auto-switch devices of the art consume valuable space and disturb in cooking and/or cleaning. Moreover, even liquid-level sensing devices currently used for cooking devices don't contain a simple and convenient means allowing the user, whenever he desires, to easily change the level at which the sensor will activate the alarm.

SUMMARY OF THE INVENTION

In accordance with the first aspect of the present invention, a novel liquid level monitoring apparatus is provided for indicating and monitoring a liquid level in a vessel having a generally upright side wall with interior and exterior surfaces. The apparatus comprises:

a floating magnet assembly comprising a floating magnet device accommodated within said vessel or in a liquid duct in liquid communication with said vessel, which floats on said liquid, and which is guided to move with the liquid level in a vertical path proximal to an internal wall of said vessel; and a sensing and control assembly preferably, located outside of said vessel, comprising at least one displaceable magnetically actuable switch, fixable at a user-selected level, proximal to the vessel's exterior surface, opposite said vertical path and a control device connected to said magnetic switch, for issuing a signal upon activation of said magnetic switch, in such that once the floating magnet is at the level of said magnetic switch, the switch will be activated.

A magnetically actuable switch, which may for example be a reed switch or a hall-effect switch, will be referred to herein at times as "magnetic switch".

In operation, the floating magnet is floatingly displaceable downward or upward along the interior wall of said vessel, in accordance to the liquid level in it, for actuating said magnetically actuable switch substantially, upon reaching a user selected liquid level to provide an output signal.

The signal issued by the control device may be an alarm signal to indicate to the user that the level of liquid has gone down to the selected level, e.g. an audio signal or a visual signal; it may be a signal to a device associated with said vessel, to stop the action which caused the liquid level to lower, e.g. a heating device in case of a cooking pot or a kettle, a pump in case of a storage container; or both.

There are cases where the sensing assembly may comprise two or even more of said switches. For example, in the case of a sensing assembly comprising two magnetic switches, the first of the two may be positioned at the first level, and the second may be positioned at a second level, below the first level. Each of said switches issuing a signal to the control unit when the liquid level is such so as to bring the floating magnet to the level of that magnetic switch. The signal issued by the control device may be different with respect to the two different levels. For example, when the liquid level reaches the first switch, an alarm signal may be generated, and when the liquid level reaches the second switch, the control unit may issue a signal to stop the action which causes the liquid level to lower, e.g. stop the heating in a case of a cooking pot or a kettle.

According to the present invention, there are two main configurations (modes) for keeping the displacement of the floating magnet in close proximity to the vessel's interior wall surface and juxtaposed to the magnetically actuable switches, located outside the vessel. According to one of the configuration (Mode-A), which is particularly suitable for a large diameter vessel, the floating magnet is located within a sleeve-like member which has free liquid flow communication with said vessel. The sleeve like member may be disposed within the container, or it may be positioned outside the vessel but in flow communication with the vessel, such that the level of the liquid therein is essentially the same as in the vessel. According to another configuration (Mode-B), which is particularly applicable for a small cross-sectional vessel, the magnet has a shape and dimension such that its device outer rims are proximal to the interior side wall of the vessel, e.g. O-ring shaped magnetic device disposed in a cylindrical vessel. In such configuration (Mode-B), the displacement of said floating-magnet is constrained by the vessel's interior wall, to be generally vertical. As will be appreciated, Mode-A or Mode-B configuration may be chosen on the basis of the intended application. Thus, for example, while Mode-A configuration will be typically applicable to big reservoirs as well as for small vessels like a cooking pot in a domestic kitchen, Mode-B configuration is typically applicable to a vessel of small cross-section.

Regardless of the configuration (Mode-A or Mode-B), there are various means for positioning and displacing said displaceable magnetically actuable switch. Thus, for example, the magnetic switch can be positioned on a support rack juxtaposed adjacent to said vessel's side wall exterior surface and displaceable along said support rack or alternatively, it can be attached directly onto the vessel's side wall exterior surface by attaching it at different levels along the side wall, e.g. by the use of a hook and pile type fastener strip (e.g. VELCRO ™-type).

It is a further object of the present invention to provide a novel alarm generating liquid-level monitoring apparatus which can be portable and transferable between, and used interchangeably with a wide variety of vessels. Also, said floating-magnet assembly, as well as said sensing unit assembly, each separately is interchangeable and can be used in various and not necessarily identical vessels.

It is a further object of the present invention to provide a novel and versatile liquid-level sensor which can be readily adapted for a wide range of applications, and to enable convenient user access to said exterior disposed magnetic-switch to allow placing it at different levels, selected by the user. The liquid-level sensing system may be designed such as to be usable with a variety of vessels of different size (like diameter and depth) and shape. Furthermore, the apparatus may be adapted for both open as well as for sealed vessels, and every vessel whose interior is inaccessible to user manipulation for various reasons (e.g. it holds hazardous material and/or there are prohibitive conditions, like high temperature, which do not lend themselves to convenient user manipulation of an interior disposed magnetically actuable switches).

It is further an object according to the first aspect of the present invention to provide a magnet based liquid-level monitoring kit with an alarm. Said kit is comprised of two main units: a magnet unit assembly to be located inside said vessel, and a sensing unit assembly to be attached to the exterior wall of the said vessel, wherein the magnet unit assembly and the sensing unit assembly can be a priori (before applied to the vessel) attached to each other or packed as a separate units. Said sensing and control unit assembly may includes: a control unit; optionally an alarm generating circuit and a support-rack, on which one or more displaceable magnetically actuable switches are positioned. Said kit can be portable, transferable, and used interchangeably with a wide variety of vessels.

In accordance with a second aspect of the present invention, a removably mountable liquid level monitoring apparatus is provided, wherein the monitoring is based on measuring changes in one or more physical properties related to said liquid. Examples of said physical properties are electrical-conductivity, light reflection or the like. Said liquid level apparatus comprises: a) at least one displaceable sensing probe with a sensing tip for sensing a physical property of said liquid; b) a sensing-tip displacement unit which enables the user to position the sensing-tip at a selected level; and c) a control unit assembly, connected to said probe for issuing a signal when said liquid is at a level below said sensing tip; and typically includes: a power supply, a detection system, and an alarm indicator, e.g. an audio or visual alarm device.

In one preferred embodiment of the second aspect of this invention, the physical property is an optical property of said liquid, e.g. changes in refraction indices. This sensing probe according to this embodiment typically includes: a light emitter source which transmits light (UV, visible, IR) to said sensing tip; an optical receiver which measure the reflected light coming from the sensing tip; and a waveguide which enables an optical communication between the emitter and the sensing tip and between the sensing tip and said receiver. The liquid level monitoring apparatus according to this embodiment is provided with one or more displaceable optical sensing tips adapted for positioning at respective user selected level and a controller responsively coupled to said sensor device for providing an output signal for at least activating an alarm device when the liquid level in the monitored liquid substantially falls to said user selected level. The liquid-level monitoring apparatus preferably provides an additional output signal for stopping the action leading to a reduction in liquid level, e.g. for switching off the heat source heating the cooking pot so that to fill an important need in both commercial and domestic kitchens for at least preventing the victuals in a cooking pot from being ruined by being cooked beyond a predetermined limit.

Also, according to the second aspect of the present invention it is a further object to provide a novel alarm generating liquid-level monitoring apparatus for heated vessels where the liquid level is monitored by means of changes in one or more physical properties related to said liquid. The apparatus can be portable, transferable, and used interchangeably with different vessels.

The liquid level monitoring apparatus, according to both aspects, may be powered by a conventional power source (i.e. a battery or mains supply), or it may be powered by a thermoelectric power supply adapted for intimate contact with a heating source, either the heating source that heat the cooking pot, such as an electric plate a gas burner or the like, or the hot surface of the cooking pot itself, and thereby produces the necessary electric power to energize at least one component of said apparatus.

These and other objects and advantages of the present invention will become more apparent upon reference to the following specification when taken in conjunction with the accompanying drawing.

BRIEF DESCRIPTION OF THE DRAWING

In order to understand the invention and how it is used, preferred embodiments will now be described by way of non-limiting examples only, with reference to the accompanying drawings in which.

BRIEF DESCRIPTION OF SPECIFIC EMBODIMENTS

Reference is first being made to FIGS. 1–5, showing a cooking pot 20 containing a liquid 21 at a level 22, provided with a lid 23 and an integral electric heating unit 24, receiving electric power through mains lead 26. Fixed to the cooking pot is a liquid level control apparatus, generally designated 28, comprising a magnetic switch assembly 30 disposed on the cooking-pot's exterior surface, a floating magnet assembly 32 in the cooking-pot's interior, and a control apparatus 34, mounted on the cooking-pot by means of hook member 36.

Figure 1:
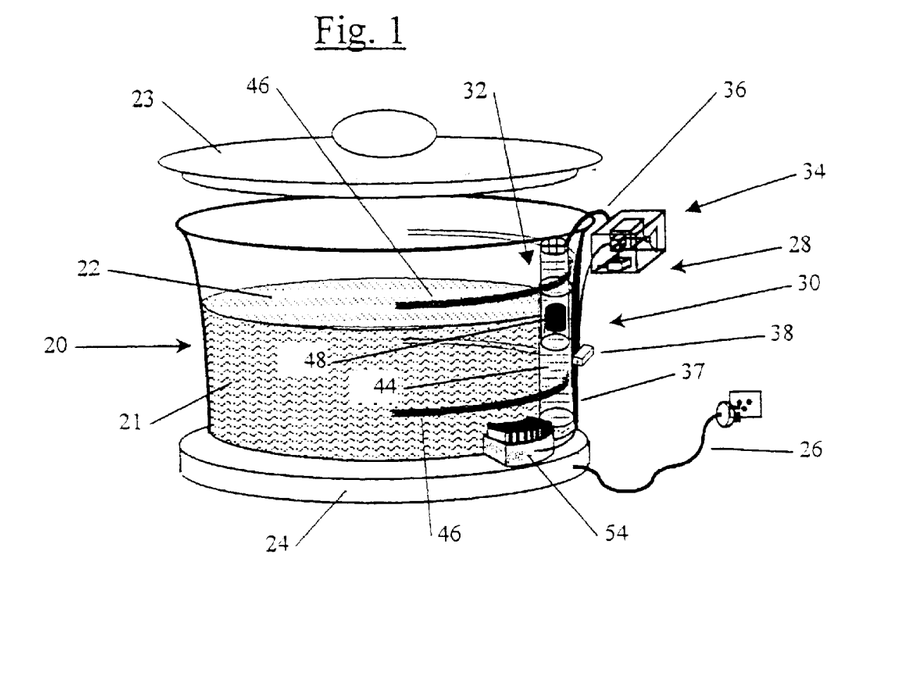
FIG. 1 is a perspective view of a cooking pot with a liquid-level monitoring apparatus configured according to an embodiment of Mode-A of the first aspect of the present invention.
Figures 2, 3, 4:
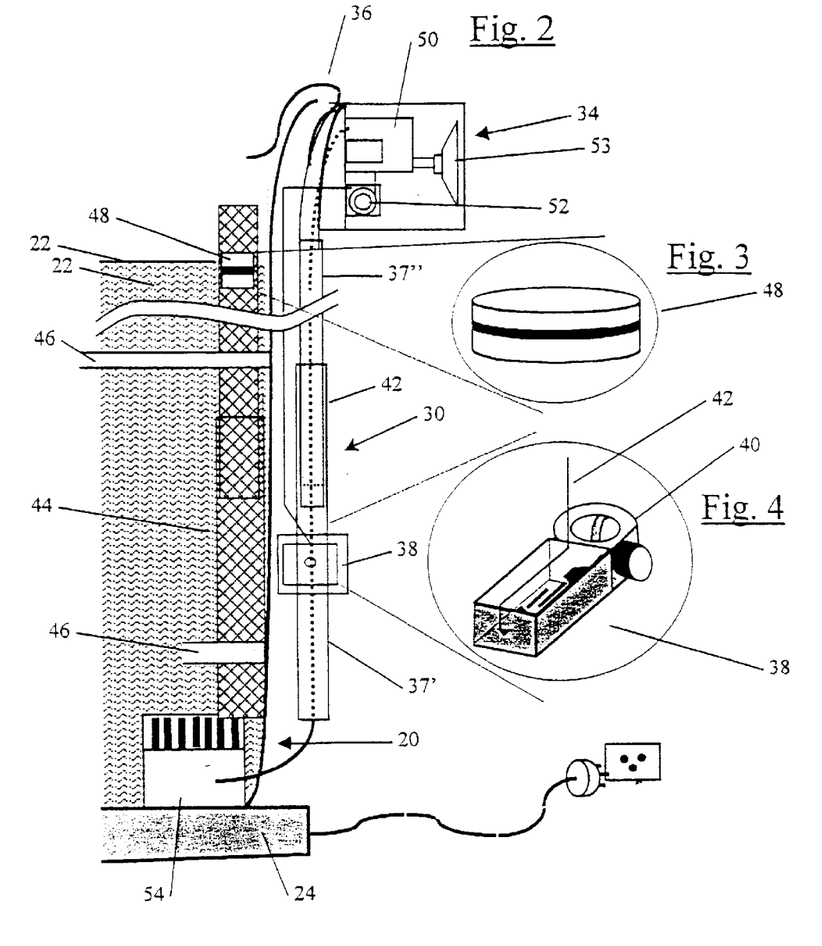
FIG. 2 is a close-up cross sectional view of the liquid-level monitoring apparatus of FIG. 1.
FIGS. 3 and 4 are enlarged perspective views of the two components, the floating magnet device and the magnetic-switch receptively, of the liquid-level monitoring apparatus in FIG. 2.

Magnetic switch assembly 30 consists of a support rod 37 and a displaceable magnetically actuated switch 38 mounted on the rod 37 by means of a sliding element 40, in which the switch can be fixed at various levels along rod 37. Switch 38 is connected by an electric lead 42, to control unit 34. Rod 37 is composed of two parts, 37' and 37" one fitted telescopically into the other, to allow it to assume various lengths for fitting on different vessels.

Floating magnet assembly 32 has a floating magnet retaining sleeve 44 and a floating magnet device 48 which is accommodated within sleeve 44. Sleeve 44 is in liquid flow communication with liquid 21 in cooking-pot 20, and is supported in place by means of spring-leaf support member 46.

The control apparatus comprises a control device 50 (FIG. 2), a retractable-type electrical wiring 52 and an indicator member 53, which, in this specific case, is an audio signal generator, e.g. a loud speaker. As will be appreciated, the signal may be other than audio, e.g. a light signal.

The apparatus further comprises a thermoelectric unit 54, which generates electricity by the heat provided by heating plate 24.

In operation, the user sets the level of magnetic switch 38, as desired, and then, if the level of the liquid decreases such that the floating magnet member 48 is at the level of switch 38, an alarm signal is generated.

Figure 5:
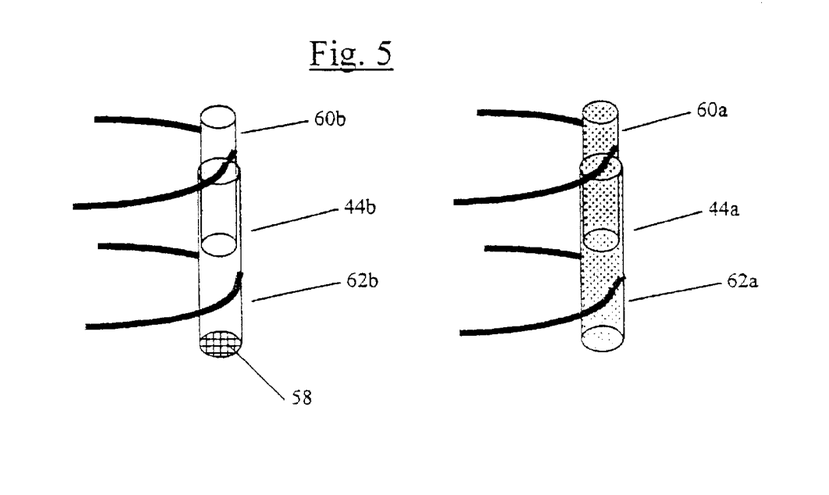
FIG. 5 shows two embodiments of the extendible sleeve-like member accommodating the magnetic device.

Retaining sleeve 44 may have various configuration, of which two embodiments are shown in FIG. 5. Sleeve 44a, shown at the right of FIG. 5, is comprised of a tubular net, and sleeve 44b, shown of the left of FIG. 5, is comprised of a tube with a bottom open end, which, in this specific case, is fitted with a sieve 58, so as to assure that the magnet is retained therein. As can be seen, both sleeve members are comprise each of two portions, 60a, 60b and 62a, 62b, with the former fitted into the latter in a telescopic manner, to allow the retaining sleeve member to assume various lengths, whereby it can be fitted into different containers.

Similarly, also the sensing and control unit assembly 28 is removable for fixing onto different containers.

Figure 6:
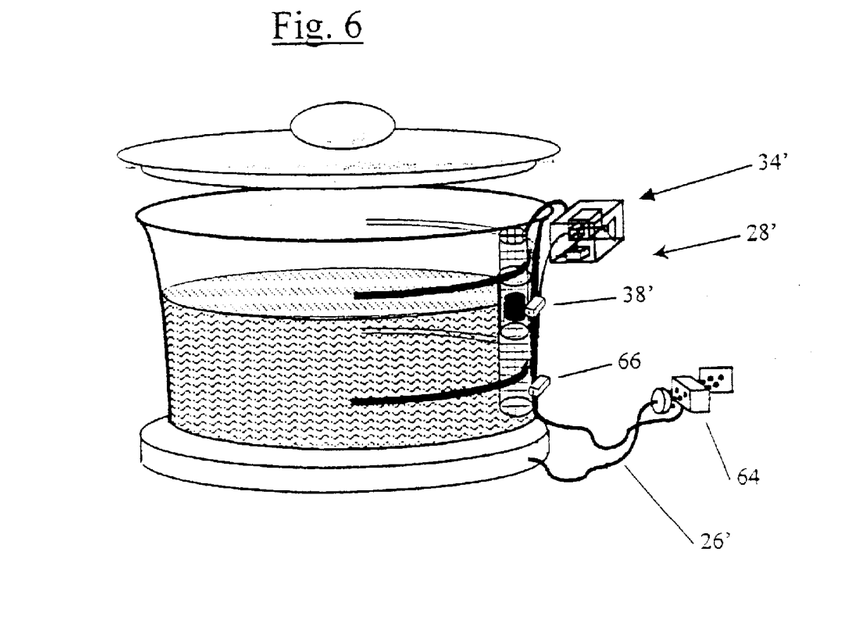
FIG. 6 is a perspective view of a cooking-pot comprising a liquid level monitoring apparatus according to an embodiment of Mode-A of the first aspect of the invention which is similar, but with some modifications, to the embodiment of FIG. 1.

FIG. 6 shows a container fitted with a sensing and control unit assembly similar to those elements of FIG. 1, the apparatus in FIG. 6 have been given the same reference numeral, with a prime indication, and the reader is referred to the description of FIGS. 1–5 for a description of their function. The differences between the embodiments of FIG. 6 to that of FIG. 1 lies in the presence in FIG. 6 of circuit breaker 64, and a second magnetic switch, 66. Circuit breaker 64 provides the electric power supply to control apparatus 34', and is further capable of disconnecting the electric power supply to mains lead, 26'. In the case of this embodiment, if the liquid level falls to a level of magnetic switch 38', an alarm is generated. If the level is reduced further to the level of magnetic switch 66, in addition to an alarm, the control apparatus disconnects the electric supply to mains lead 26', whereby heating is terminated. It will be appreciated that the switching off of the heat source may be achieved by various means other than those shown. For example, in the case of a gas heater, the control apparatus may switch off the gas supply by providing an electric signal to an electric switch in the gas system; etc.

Figures 7, 8, 9:
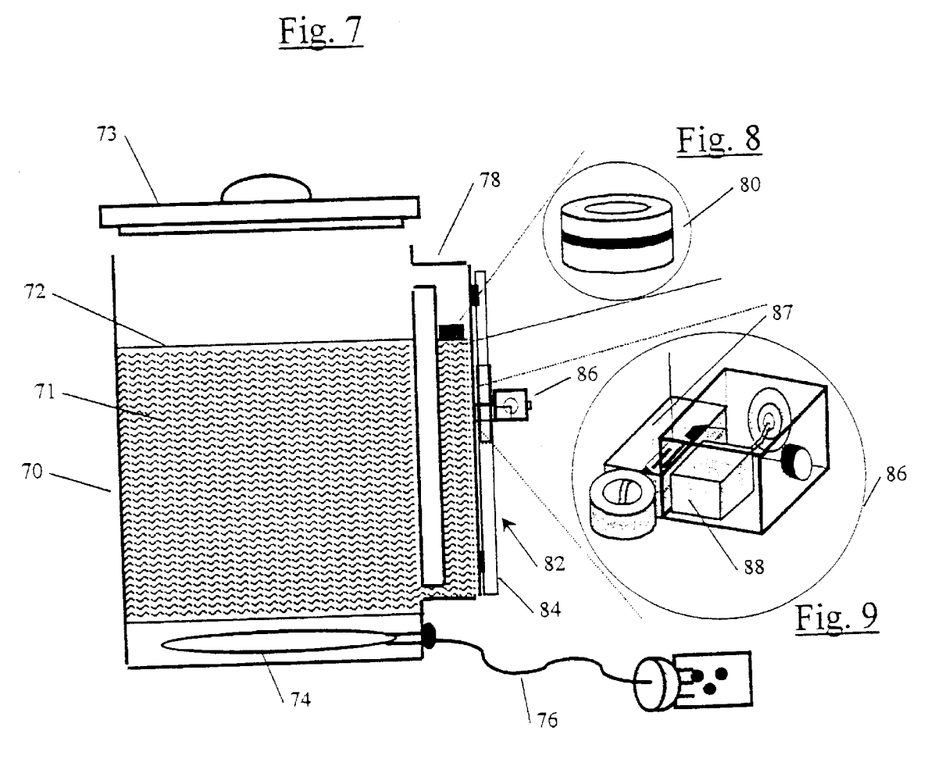
FIG. 7 is a longitudinal cross sectional view of an electric kettle fitted with a liquid level monitoring apparatus, configured according to an embodiment of Mode-A of the first aspect of the invention.
FIGS. 8 and 9 are enlarged perspective views of the two components, the floating magnet device and the magnetic switch receptively, of the liquid-level monitoring apparatus in FIG. 7.

Reference is now being made to FIG. 7 showing electric kettle 70 containing a liquid 71 at a level 72, having a lid 73, and an integral heating element 74, connected to mains lead 76. The kettle has a hollow handle, 78, which is in liquid flow communication with the interior of kettle 70, and accommodates a floating magnet member 80, shown in perspective view in FIG. 8. In this case, the magnet has the shape of an annulus. Fitted on the external surface of handle 78, is a liquid level sensing and control apparatus 82, comprising a telescopic sliding support member 84, a sensing and control device 86 which includes a magnetic switch 87 attached to a control member 88, shown in perspective view in FIG. 9. Thus, when the liquid level decreases to a level below that set by the user, an alarm signal is generated.

Figures 10, 11, 12:
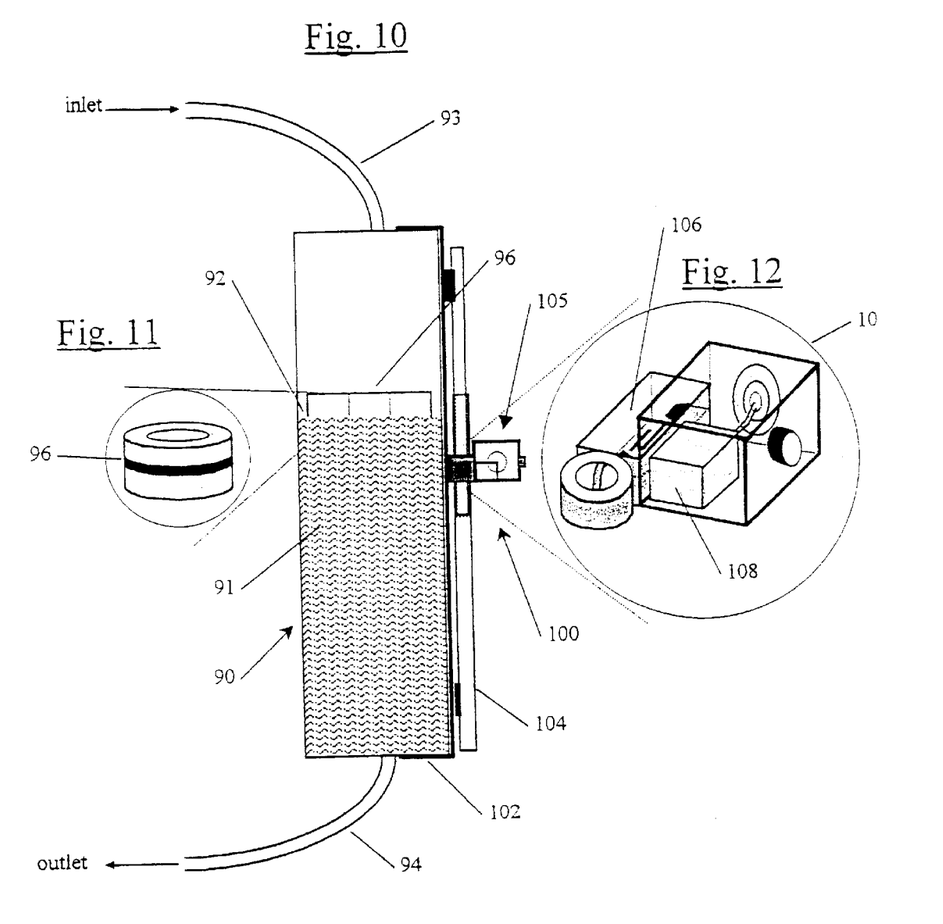
FIG. 10 shows a longitudinal cross sectional view of a medical infusion drip chamber configured according to Mode-B of the first aspect of the invention.
FIGS. 11 and 12 are enlarged perspective views of two components, the floating magnet device and the magnetic switch receptively, of the liquid-level monitoring apparatus in FIG. 10.

Another embodiment, according to Mode-B of the first aspect of the invention, can by seen in FIG. 10. Liquid container 90, e.g. a medical infusion drip chamber containing an infusion liquid 91 at a level 92, having a liquid inlet 93 and a liquid outlet 94, accommodated a ring-shaped floating magnet member 96, shown in perspective view in FIG. 11, which has an outer diameter slightly less than the inner diameter of container 90. Liquid level monitoring apparatus 100 is fitted onto container 90 by means of an adapter 102, and comprises a sliding support member 104 a sensing and control unit 105, containing a magnetic switch 106 and a control device 108, shown in perspective view in FIG. 12. The function of the liquid level apparatus is similar to that described in connection with the previous embodiments, and the reader is referred to the description there for a more detailed explanation of the structure and function.

Figure 13A:
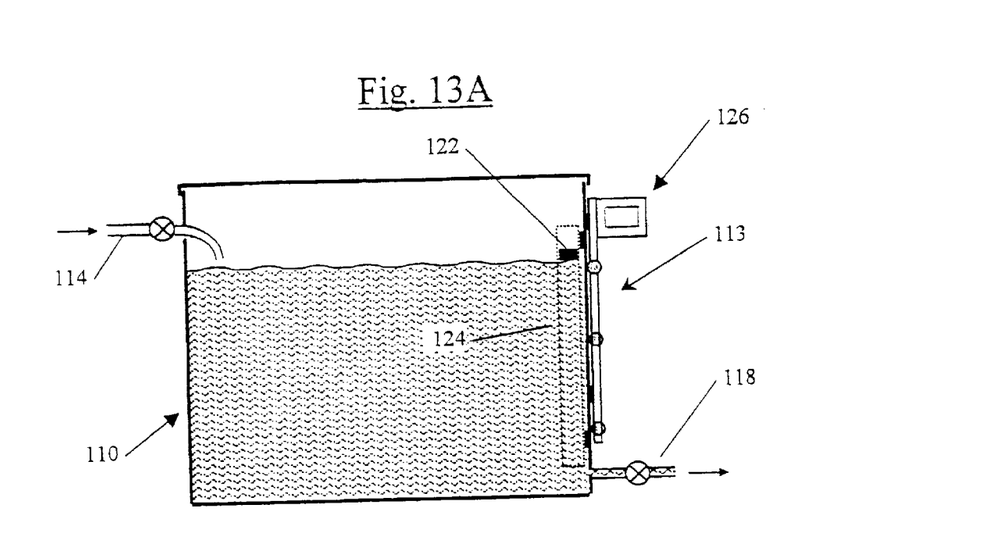
FIG. 13A and FIG. 13B show two embodiments of a liquid reservoir fitted with a liquid-level monitoring apparatus configured according to two embodiments of the first aspect of the invention.
Figure 13B:
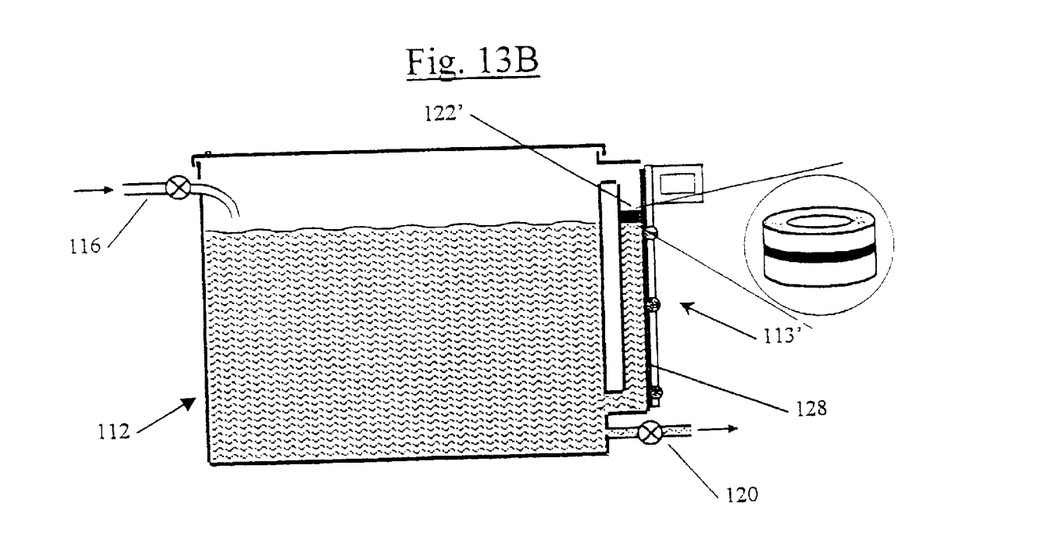

FIGS. 13A and 13B show two liquid reservoirs, 110 and 112, which are fitted each with liquid level monitoring apparatus 113 and 113', respectively two different embodiments, and having respective liquid inlets 114 and 116, and respective outlets, 118 and 120. In FIG. 13A, reservoir 110 has a floating magnet member 122, accommodated within a sleeve 124, within the reservoir, and a sensing and control unit assembly 126, as that described in FIG. 1. In distinction from FIG. 13A, the liquid level apparatus in the embodiment of FIG. 13B is very similar to those described in FIG. 7, with a magnet accommodating floating tube, 128, accommodating magnet 122', but otherwise, the manner of the sensing and control unit assembly in the embodiment of FIG. 13B, is essentially similar to that of FIG. 13A.

Figures 14, 15:
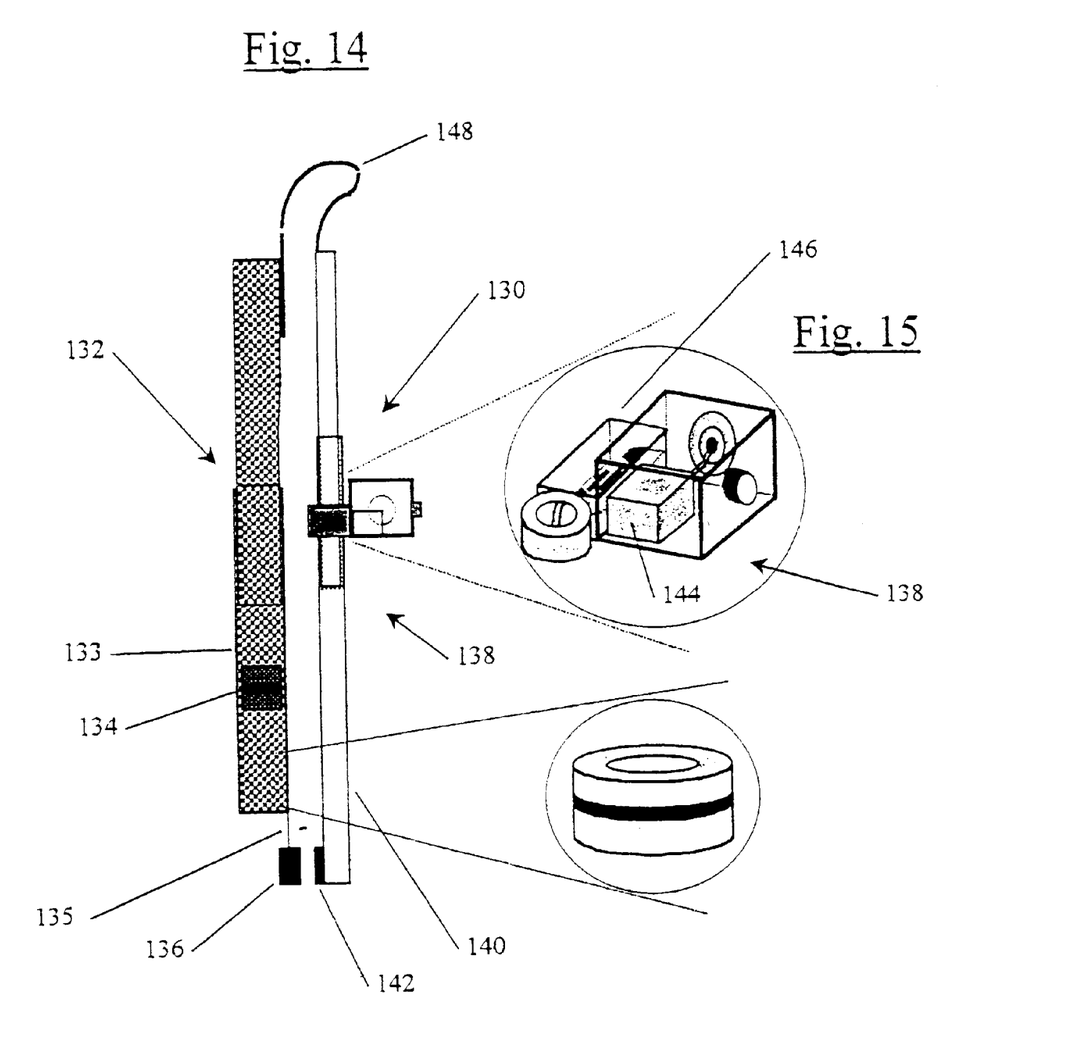
FIG. 14 shows a longitudinal cross sectional view of liquid level apparatus kit, according to Mode-A of the first aspect of the invention.
FIG. 15 is a enlarged perspective views of the sensing unit of the liquid-level vertical apparatus in FIG. 14.

Reference is now being made to FIG. 14, showing an embodiment of a liquid level monitoring apparatus kit of the first aspect of the invention. The liquid level apparatus kit 130, comprises: a floating magnet assembly 132, which includes a telescopic sleeve-like net 133, holding a floating magnet 134 and fitted at its bottom with a magnet support member 135 holding a magnet 136 and a sensing and control unit assembly 138, including a telescopic sliding support member 140, fitted at its bottom with a magnet 142 with its magnetic poles being such so as to be attracted to magnet 136, and a control device 144 accommodating a magnetic switch 146, shown in perspective view in FIG. 15. The floating magnet unit assembly 132 and the sensing unit assembly 138 are connected to each other by a pliable wire or band 148. In use of the liquid level apparatus kit 130, the floating magnet assembly 132 is positioned inside a vessel (not shown) while the sensing unit assembly 138, is positioned outside the vessel. The floating magnet assembly and the sensing and control unit assembly are kept in close proximity to the vessel's interior wall and to the exterior wall, respectively, and also to each other by the pliable wire or band 148 at the top, and by the two magnets 136 and 142 at the bottom. The function of the control apparatus kit 130, is similar to that described in connection with the previous embodiments, and the reader is referred to the description there for a more detailed explanation.

Figures 16, 17:
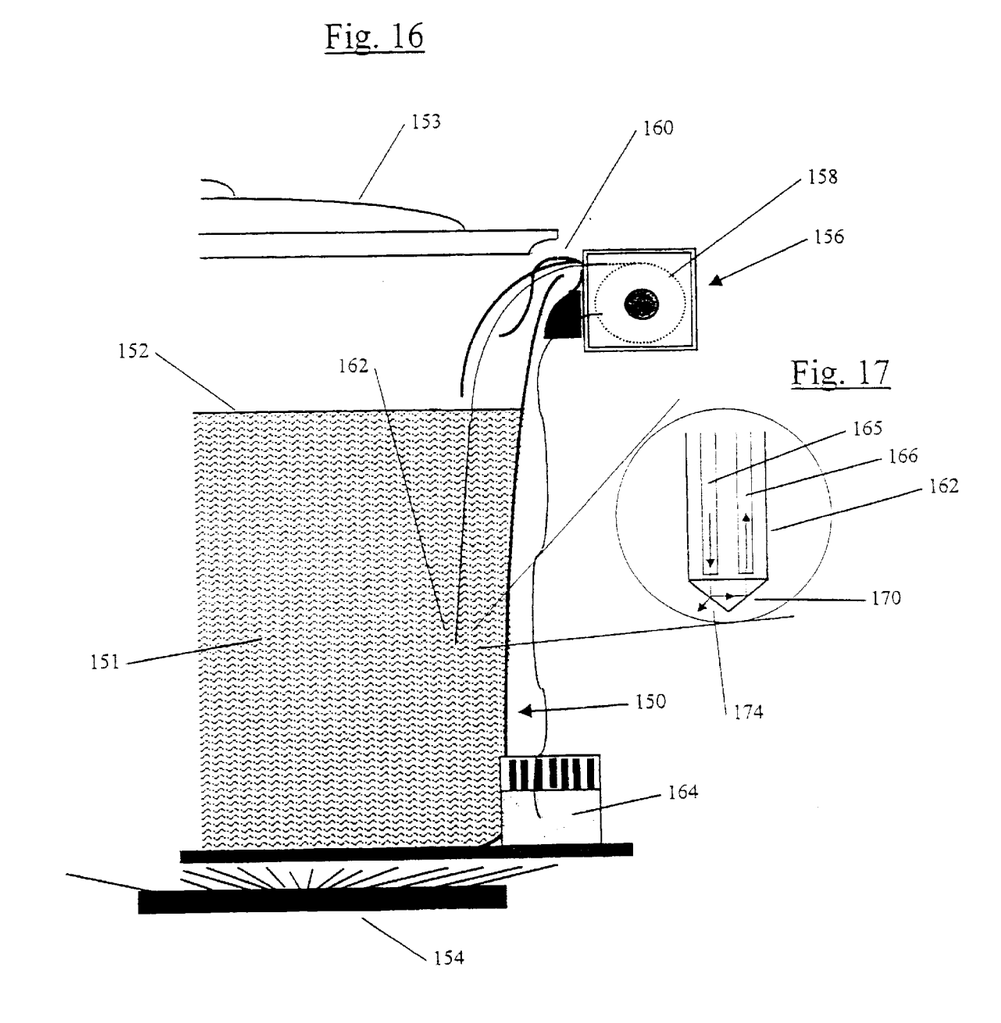
FIG. 16 is a partial longitudinal cross sectional view of a cooking pot fitted with a removable liquid level monitoring apparatus in accordance with the second aspect of the invention.
FIG. 17 is an enlarged cross sectional view of the sensing tip of the apparatus of FIG. 16.

A liquid level control apparatus, according to the second aspect of the invention, can be seen in FIG. 16. In this case, cooking-pot, 150, containing a liquid 151 to a level 152, having a lid 153, and which is seen herein heated by gas burner 154, is fitted with a liquid level control apparatus 156. Apparatus 156 has a control device 158, mounted on the cooking-pot by means of a hook member 160, a sensing probe 162, and a thermoelectric unit, 164, which provides electric power generated by the heat provided by gas burner 154. As can be seen in the enlarged cross sectional view in FIG. 17, sensing probe 162, contains two optical waveguides, 165 and 166. While waveguide 165 leads light emitted from light source 168 (See FIG. 18B) to prism 170, the other waveduide, 166, leads light back from prism 170 to the photo-detector 172 (See FIG. 18B).

As long as the sensor tip is immersed in liquid, certain amount of light will be dispersed into the liquid, as represented by arrow 174 in FIG. 17, and once the liquid level goes down below the sensing tip, more light will be reflected through waveguide 166 to the photo-detector 172, and then an alarm signal will be generated.

Figure 18A:
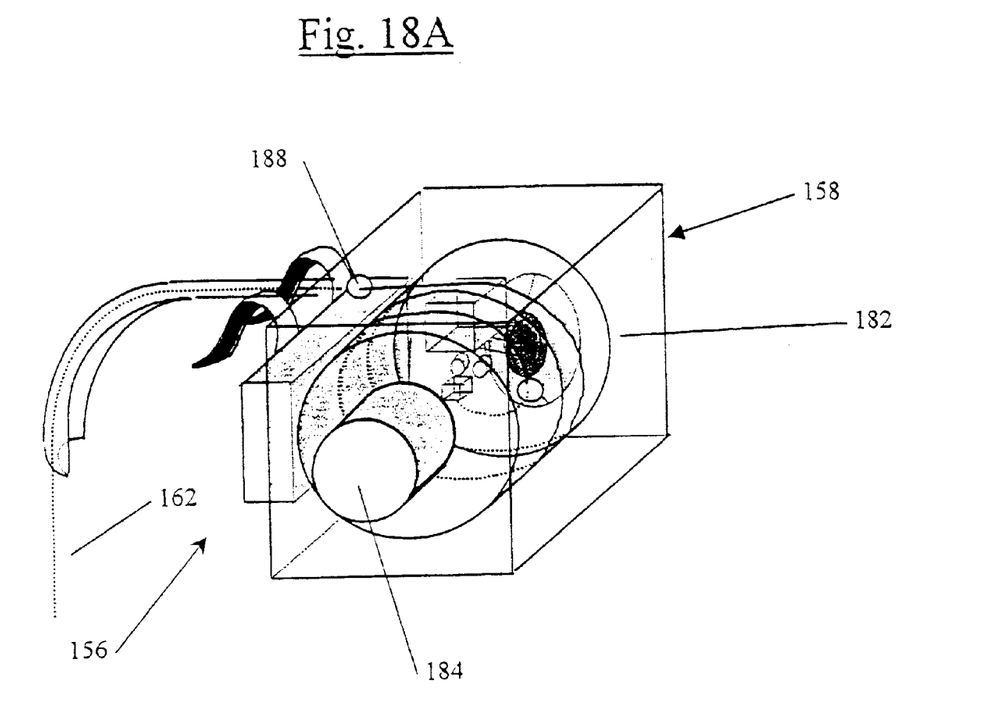
FIG. 18A and FIG. 18B are, respectively, a close-up perspective view and a cross sectional view of the control-unit assembly of the apparatus shown in FIG. 16.
Figure 18B:
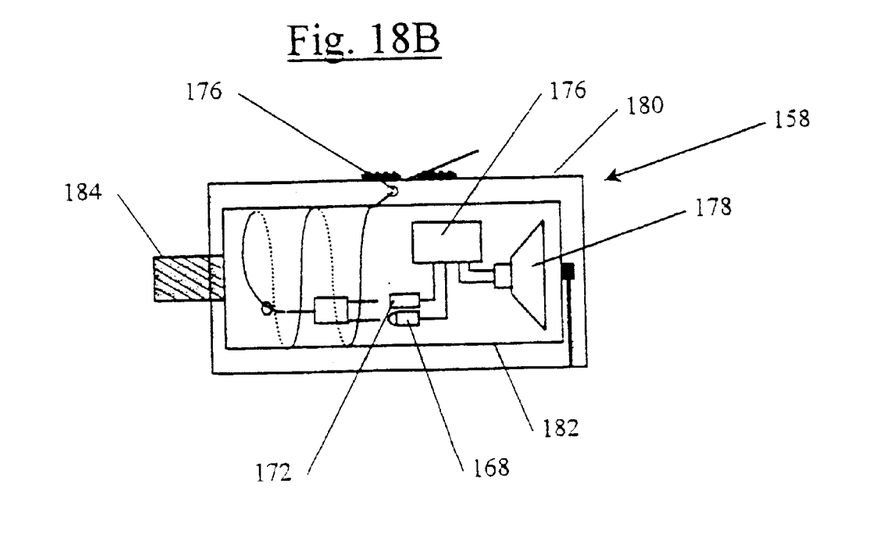

The structure of the control device 156 can be seen in FIG. 18A and 18B. It comprises an external housing 180 and an internal cylindrical housing 182, which is rotational within the external housing. This rotation can be induced by means of control knob 184. The sensing probe 162, has a proximal segment which is wound onto internal housing 182, and thus by rotation of knob 184, the waveguide can be extended or retracted through opening 188 in external housing 180, with a corresponding change in the level of the sensor tip within the liquid.

As can further be seen in FIG. 18B, in addition to the light source 168, which may be a light emitting diode (LED) or a laser, and photo-detector 172, the control device further comprises a control processor 176 and an alarm signal generator 178, e.g. an audio signal generator.

I claim:

1. A liquid level control apparatus for monitoring the liquid level in a liquid containing vessel having a generally upright side wall with interior and exterior surfaces, and for providing a signal for indicating that the liquid has reached a predetermined level and, if desired, for activating an output signal or safety means, which comprises:

a floating magnet assembly comprising a floating magnet and an elongated guide container for constraining said floating magnet assembly to become displaced, in a vertical path proximal to the internal wall of said vessel, from an initial floating level within said container, wherein said floating magnet comprises a permanent magnet connected to a float for concurrent and equal displacement;

a liquid communication between the vessel and the guide container, so that the liquid level will be the same and will change substantially concurrently and by the same amount in both of them, at least after it has reached said initial floating level;

a sensing and control assembly located outside said vessel, comprising a vertically extended support; at least one magnetically actuatable switch displaceably mounted on said support; said support being so positioned with respect to said vertical path that said floating magnet will be close enough to said switch to actuate it, at least at one pre-selected actuation level; and a control device connected to said magnetic switch for generating an output signal, including alarm and safety signals discontinuing in operation, upon actuation of said magnetic switch; positioning said displaceable switch at a selected level, defines the pre-selected liquid level at which said switch will be actuated.

2. Apparatus according to claim 1, wherein at least one of the magnetic switches is a reed switch.

3. Apparatus according to claim 1, wherein at least one of the magnetic switches is a hall-effect switch.

4. Apparatus according to claim 1, wherein said displaceable magnetic switch can be positioned directly onto the exterior wall of said vessel.

5. Apparatus according to claim 4, wherein said displaceable magnetic switch is positioned at a user selected level by a hook-and-pile type fastening means.

6. Apparatus according to claim 1 wherein said displaceable magnetic switch is attached to a support member.

7. Apparatus according to claim 6, wherein said displaceable magnetic switch is connected to a sliding element provided with an arrest member allowing the sliding of said magnetic switch along said support member and fixing it at a user selected level.

8. Apparatus according to claim 7, wherein said support member is extendible.

9. Apparatus according to claim 1, wherein the vertical movement of said floating magnet is guided by an elongated sleeve-like member situated proximal to the vessel's interior surface and having free liquid flow communication with said vessel.

10. Apparatus according to claim 9, wherein each of the floating magnet assemblies and the sensing and control assembly, are separate assemblies.

11. Apparatus according to claim 9, wherein said floating magnet assembly and said sensing unit assembly are connected to one another.

12. Apparatus according to claims 9 wherein said sleeve-like member is extendible.

13. Apparatus according to claim 1 wherein the floating magnet device has an external shape and diameter such that it is fitted snugly within the vessel, with the magnet device's external rims being in close proximity to the interior surface of said vessel.

14. A liquid level Apparatus according to claim 13, wherein said vessel is cylindrical and said floating magnet has an annular shape.

15. Apparatus according to claim 14, wherein said vessel is a medical infusion drip chamber.

16. Apparatus according to claim 1, wherein the floating magnet is disposed in a vertical tube which is located outside said vessel and which is in liquid-flow communication with said vessel.

17. Apparatus according to claim 1, wherein said vessel is a heated vessel holding liquid, to be heated.

18. Apparatus according to claim 17, wherein said vessel is a cooking pot or a kettle.

19. Apparatus according to claim 32, wherein said signal activates an alarm.

20. Apparatus according to claim 1, wherein said signal interrupts the action which gives rise to a reduction in the liquid level.

21. Apparatus according to claim 17, having a thermoelectric power supply, with a thermoelectric unit, for powering at least one electric component of the apparatus.

22. Apparatus according to claim 21, wherein the thermoelectric unit is heated directly by the heating source.

23. Apparatus according to claim 21, wherein the thermoelectric unit is attached to the walls of the vessel, and heated by heat transferred by said walls.

24. Apparatus according to any one of claim 1, wherein said apparatus is transferable and interchangeably useable on a different vessel.

25. Apparatus according to claim 1, wherein the guide container is a sleeve-like member.

26. Apparatus according to claim 25, wherein the sleeve-like member is disposed within the vessel.

27. Apparatus according to claim 25, wherein the sleeve-like member is disposed outside the vessel and in flow communication with it.

28. Apparatus according to claim 25, wherein the sleeve-like member comprises at least two telescopic portions.

29. Apparatus according to claim 25, wherein the sleeve-like member is comprised of a tubular net.

30. Apparatus according to claim 25, wherein the sleeve-like member is a tube having a bottom open end.

31. Apparatus according to claim 25, wherein the sleeve-like member is a filter-like member which prevents solid materials, which might disturb the free vertical transmission of the floating magnet, from entering inside said filter-like member.

32. Apparatus according to claim 25, wherein the guide container is the vessel itself, the floating magnet assembly having such shape and dimensions that its outer rims are proximal to the interior side wall of said vessel.

33. Apparatus according to claim 25, wherein the sleeve-like member is fixed to the vessel.

34. Apparatus according to claim 25, wherein the sleeve-like member is fixed to the floating magnet assembly.

35. Apparatus according to claim 25, wherein the sleeve-like member and the floating magnet assembly are fixed to the vessel.

* * * * *

UNITED STATES PATENT AND TRADEMARK OFFICE
CERTIFICATE OF CORRECTION

PATENT NO.     : 6,028,521
DATED          : February 22, 2000
INVENTOR(S)    : Issachar It is certified that error appears in the above-identified patent and that said Letters Patent is hereby corrected as shown below:

Claim 19,
Line 1, replace "32" with -- 1 --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*